United States Patent
Huang et al.

(10) Patent No.: US 6,340,532 B1
(45) Date of Patent: Jan. 22, 2002

(54) SHRINK FILMS

(75) Inventors: James Chin-Kuang Huang; Peter Andrew Sipos, both of Calgary; Lawrence Thomas Kale, Cochrane, all of (CA); Patrick R. Thomas, Vacavilla, CA (US); James Arthur Auger, Calgary (CA)

(73) Assignee: Nova Chemicals (International) S.A.

( * ) Notice: Subject to any disclaimer, the term of this patent is extended or adjusted under 35 U.S.C. 154(b) by 0 days.

(21) Appl. No.: 09/773,644

(22) Filed: Jan. 31, 2001

(51) Int. Cl.⁷ .................................................. B32B 27/32
(52) U.S. Cl. ........................ 428/523; 428/516; 428/910; 526/348.1
(58) Field of Search ................................ 428/516, 523, 428/910; 526/348.1

(56) References Cited

U.S. PATENT DOCUMENTS

| | | | |
|---|---|---|---|
| 4,551,380 A | 11/1985 | Schoenberg | 428/218 |
| 4,760,116 A | 7/1988 | Roberts | 525/221 |
| 5,492,876 A | 2/1996 | Gillis et al. | 502/113 |
| 5,519,098 A | 5/1996 | Brown et al. | 526/116 |
| 5,589,555 A | 12/1996 | Zboril et al. | 526/64 |
| 5,591,390 A | 1/1997 | Walton et al. | 264/456 |
| 5,595,705 A | 1/1997 | Walton et al. | 264/456 |
| 6,024,483 A | 2/2000 | Burke et al. | 366/295 |

*Primary Examiner*—D. S. Nakarani
(74) *Attorney, Agent, or Firm*—Kenneth H. Johnson

(57) ABSTRACT

Shrink films having an outstanding balance of physical properties and shrink properties are manufactured from "pseudohomogeneous" linear low density polyethylene resin. The preferred pseudohomogeneous resins used in the present invention are prepared with an advanced Ziegler Natta catalyst (having a magnesium component and a titanium component), preferably in medium pressure solution polymerization process. The films of this invention may be employed in a variety of uses, including, 1) "overwrap" packaging to protect goods during transportation, distribution, handling and display; and 2) food packaging, such as shrink wrap for frozen poultry, primal meat cuts and processed meat and cheese products.

11 Claims, No Drawings

SHRINK FILMS

FIELD OF THE INVENTION

This invention relates to shrink films made from pseudohomogeneous linear low density polyethylene.

BACKGROUND OF THE INVENTION

The term "shrink film" refers to a plastic wrapping film which has the characteristic of shrinking when it is heated to near the melting point of the film. These films are commonly manufactured from plastic resins such as polyvinyl chloride (PVC); polypropylene (PP); linear-low density polyethylene (LLDPE); low density polyethylene (LDPE); high density polyethylene (HDPE); copolymers of ethylene and vinyl acetate (EVA); copolymers of ethylene and vinyl alcohols (EVOH); ionomers (e.g. Surlyn™); copolymers of vinylidene chloride (e.g. PVDC, SARAN™); copolymers of ethylene acrylic acid (EAA); polyamides (PA); among others.

End uses of these films include food packaging (for example, oxygen and moisture barrier bag for frozen poultry, primal meat cuts and processed meat and cheese products for preservation of freshness and hygienics) and non-food packaging (for example, "overwraps" for protecting goods against damage, soiling, tampering and pilferage) during transportation, distribution, handling and display. An example of end use is found in retail sales where the films are wrapped air-tight around single or multiple items of compact disks, audio/video tapes, computer software boxes, magazines, confectionery, boxed products, single serve bowls, etc. Another example of end use is found in wholesale retailing where multiple containers of bottled and canned goods such as beverages, condiments and personal hygiene products are sold in bulk. Yet another example is found in courier shipping where singular items of shrink-wrapped sporting goods and household appliances are now safely transported without the need for bulky protective cardboard cartons.

Films of the present invention must be made from linear low density polyethylene. Linear low density polyethylene (LLDPE) is conventionally prepared by a polymerization process using a so-called Ziegler Natta catalyst. It is well known to those skilled in the art that the conventional LLDPE resins prepared with Ziegler Natta catalysts do not have a uniform structure or composition. In particular, these conventional resins typically contain a minor amount of a very low density copolymer; a major portion of the "copolymer" having the desired molecular weight and density; and a large "homopolymer" fraction (which does not contain a meaningful amount of the desired comonomer). This lack of polymer homogeneity is associated with several disadvantages; for example 1) "organoleptic" problems caused by the low molecular weight material; and 2) suboptimal impact strengths which are believed to be caused by the crystallinity of the homopolymer fraction. The development of "homogeneous polyethylene" resins has mitigated these disadvantages.

Homogeneous resins may be prepared with the so-called metallocene catalysts which are well known and widely described in the literature.

The resulting "homogeneous" resins have a very uniform composition as evidenced by the substantial absence of very low molecular weight/low density fractions and/or homopolymer fractions. These homogeneous resins exhibit excellent organoleptic properties and impact strength properties. However, films made with homogeneous resins often have deficient tear properties. In addition, shrink properties may become "unbalanced" (with, for example, a greater shrink force in the machine direction then the transverse direction (TD) or even a negative TD shrinkage) when shrink films are made with highly homogeneous resins.

U.S. Pat. Nos. 5,591,390 and 5,595,705 (the disclosures of which are incorporated herein by reference) describe the preparation of shrink films made with a sub group of homogeneous resins, namely homogeneous resins having long chain branching. However, such resins are comparatively expensive.

The present invention provides a shrink film which mitigates certain of the disadvantages of films made from either "conventional" and "homogeneous" polyethylene resins.

SUMMARY OF THE INVENTION

The present invention provides a monolayer shrink film having, in non-crosslinked form, 1) a dart impact strength as determined by ASTM D1709 of greater than 450 grams per mil; 2) a tear strength as determined by ASTM D1922 of greater than 25 grams per mil in the transverse direction; and 3) a shrink tension of greater than 400 pounds per square inch (psi) in the machine direction; wherein said shrink film is prepared from a pseudohomogeneous linear low density polyethylene having a COHO ratio of from 3.5/1 to 19/1.

While not wishing to be bound by any theory, it is believed that the excellent properties of the films of this invention are attributable to two essential characteristics of the LLDPE used to make them, namely a combination of (a) a comparatively broad molecular weight distribution and (b) the presence of a pseudohomogeneous comonomer distribution (as evidenced by the copolymer/homopolymer or COHO ratio).

It is believed that the "pseudohomogeneous" LLDPE resins of the type described above have not been heretofore commercially available. We have discovered that shrink film made from these resins has a very surprising and highly desirable balance of strength properties and shrink properties which are particularly well suited for mono- or multilayer film constructions for food or non-food packaging.

Shrink films must have excellent strength properties and puncture resistance in addition to the obvious need for shrink characteristics to conform to the shape of the packaged goods and therefore allow for air-tightness and attractive shelf appearance.

It is well known to "crosslink" the films (for example, by irradiation) and/or to prepare multilayer shrink films in order to improve these "strength" and "puncture" properties as well as to improve barrier properties. The films of the present invention have excellent strength and puncture properties in the form of an uncrosslinked, monolayer film. However, it is also with the scope of the invention to further improve the films of the present invention via crosslinking and/or "multi-layering" technique.

Multilayer films are most commonly prepared by coextrusion (as opposed to lamination). Such films are available in constructions of from two to eleven layers. Films having between three and nine layers are typical at the present time. The use of the film of the present invention as the "core layer(s)" (i.e. one or more of the non-surface layers) of a multilayer construction is particularly preferred.

It is also within the scope of the present invention to prepare a multilayer film having at least one layer of film according to the present invention and one or more layers prepared from completely different plastic resins (such as LDPE, PP or EVA).

Shrink film is prepared by a blown film extrusion process (as opposed to a "cast" film process). The blown film process is well known to those skilled in the art.

DETAILED DESCRIPTION

Shrink film is now typically produced using two different processes known to those skilled in the art as 1) the "tenter framing" or 2) the "double bubble" process. In the double bubble process, an initial tube is extruded and then cooled or quenched (often using a water cooling system) before being subsequently expanded (and oriented in both the machine and transverse direction) through a heating oven.

The preparation of a multilayer shrink film is described in more detail in U.S. Pat. No. 4,551,380 (Shoenberg) and the preparation of a monolayer shrink film is described in U.S. Pat. No. 4,760,116 (Roberts). The detailed descriptions which are provided in these patents, and the aforementioned U.S. Pat. Nos. 5,591,390 and 5,595,705, are incorporated herein by reference.

As previously noted, the films of the present invention must be prepared using a pseudohomogeneous linear low density polyethylene resin. As used herein, the term "pseudohomogeneous" means that the resin has a copolymer/homopolymer (or "COHO") ratio of from 3.5/1 to 19/1 and is preferably from 4.0 to 6.0. Stated alternatively, this means that the pseudohomogeneous resins of the present invention are from about 78% copolymer (corresponding to a COHO ratio of 3.5/1) to 95% copolymer (corresponding to a COHO ratio of 19/1) with the balance being homopolymer. Similarly, the preferred copolymers are from 80% copolymer to about 86% copolymer with the balance being homopolymer. In contrast, conventional LLPDE resins of the same density (made for example, with conventional Ziegler Natta catalysts in conventional polymerization reactors) generally have a COHO ratio of less than 4 (with a COHO ratio of from 2 to 3 being common) and "homogeneous" resins (i.e. resins made with a so-called single site catalyst, such as a metallocene catalyst) are effectively 100% copolymer (i.e. with no appreciable amounts of homopolymer being detectable by conventional analytical techniques).

The LLDPE resins used in the present invention are preferably prepared in using a highly efficient Ziegler Natta catalyst and in a very well mixed solution polymerization reactor. In another preferred embodiment of this invention, a "dual reactor" polymerization process is used to broaden the molecular weight distribution ("MWD") of the preferred LLDPE.

A. Description of Ziegler Natta Catalyst

The term "Ziegler Natta catalyst" is well known to those skilled in the art. A Ziegler Natta catalyst may be used in this invention. Ziegler Natta catalysts comprise at least one transition metal compound of a transition metal selected from groups 3, 4 or 5 of the Periodic Table (using IUPAC nomenclature) and an organoaluminum cocatalyst which is defined by the formula:

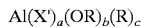

$Al(X')_a(OR)_b(R)_c$ wherein: X' is a halide (preferably chlorine); OR is an alkoxy or aryloxy group; R is a hydrocarbyl (preferably an alkyl having from 1 to 10 carbon atoms); and a, b or c are each 0, 1, 2 or 3 with the provisos text a+b+c=3 and b+c≧1.

It is preferred that the transition metal compounds contain at least one of titanium or vanadium. Exemplary titanium compounds include titanium halides (especially titanium chlorides, of which $TiCl_4$ is preferred); titanium alkyls; titanium alkoxides (which may be prepared by reacting a titanium alkyl with an alcohol) and "mixed ligand" compounds (i.e. compounds which contain more than one of the above described halide, alkyl and alkoxide ligands). Exemplary vanadium compounds may also contain halide, alkyl or alkoxide ligands. In addition vanadium oxy trichloride ("$VOCl_3$") is known as a Ziegler Natta catalyst component and is suitable for use in the present invention.

As will be appreciated by those skilled in the art of ethylene polymerization, conventional Ziegler Natta catalysts may also incorporate additional components such as an electron donor (for example an amine or an ether) and/or a magnesium compound (for example a magnesium alkyl such as a butyl ethyl magnesium). A halide source (which is typically a chloride such as tertiary butyl chloride) is typically used when a magnesium compound is present.

Such components, if employed, may be added to the other catalyst components prior to introduction to the reactor or may be directly added to the reactor.

It is highly preferred that the Ziegler Natta catalyst contains a titanium compound, a magnesium alkyl compound and a chloride compound and that an aluminum alkoxide is used as the cocatalyst.

The Ziegler Natta catalyst may also be "tempered" (i.e. heat treated) prior to being introduced to the reactor (again, using techniques which are well known to those skilled in the art and published in the literature). Particularly preferred Ziegler Natta catalysts and methods of preparing them are described in U.S. Pat. Nos. 5,492,876; 5,519,098; and 5,589,555.

B. Description of Solution Polymerization Process

Solution processes for the copolymerization of ethylene and an alpha olefin having from 3 to 12 carbon atoms are well known in the art. These processes are conducted in the presence of an inert hydrocarbon solvent typically a $C_{5-12}$ hydrocarbon which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent which is commercially available is "Isopar E" ($C_{8-12}$ aliphatic solvent, Exxon Chemical Co.).

The solution polymerization process of this invention preferably uses at least two polymerization reactors. The polymer solution exiting from the first reactor is preferably transferred to the second polymerization (i.e. the reactors are most preferably arranged "in series" so that polymerization in the second reactor occurs in the presence of the polymer solution from the first reactor).

The polymerization temperature in the first reactor is from about 80° C. to about 180° C. (preferably from about 120° C. to 160° C.) and the second reactor is preferably operated at a slightly higher temperature. Cold feed (i.e. chilled solvent and/or monomer) may be added to both reactors or to the first reactor only. The polymerization enthalpy heats the reactor. The polymerization solution which exits the reactor may be more than 100° C. hotter than the reactor feed temperature. The polymerization reactor(s) must be "stirred reactors" (i.e. the reactors are extremely well mixed with a good agitation system). Agitation efficiency may be determined by measuring the reactor temperature at several different points. The largest temperature difference (i.e. between the hottest and coldest temperature measurements) is described as the internal temperature gradient for the polymerization reactor. A very well mixed polymerization reactor has a maximum internal temperature gradient of less than 10° C. A particularly preferred agitator system is described in copending and commonly assigned U.S. Pat. No. 6,024,483. Preferred pressures are from about 500 psi to 8,000 psi. The most preferred reaction process is a "medium pressure process", which means that the pressure in each reactor is preferably less than about 6,000 psi (about 42,000 kilopascals or kPa), and most preferably from about 1,500 psi to 3,000 psi (about 14,000–22,000 kPa).

Suitable monomers for copolymerization with ethylene include $C_{3-12}$ alpha olefins which are unsubstituted or substituted by up to two $C_{1-6}$ alkyl radicals. Illustrative non-limiting examples of such alpha-olefins are one or more of propylene, 1-butene, 1-pentene, 1-hexene, 1-octene and 1decene. Octene-1 is highly preferred.

The monomers are dissolved/dispersed in the solvent either prior to being fed to the first reactor (or for gaseous monomers the monomer may be fed to the reactor so that it will dissolve in the reaction mixture). Prior to mixing, the solvent and monomers are generally purified to remove potential catalyst poisons such as water, oxygen or other polar impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) is preferably treated in a similar manner. The feedstock may be heated or cooled prior to feeding to the first reactor. Additional monomers and solvent may be added to the second reactor, and it may be heated or cooled.

Generally, the catalyst components may be premixed in the solvent for the reaction or fed as separate streams to each reactor. In some instances premixing may be desirable to provide a reaction time for the catalyst components prior to entering the reaction. Such an "in line mixing" technique is described the patent literature (most notably U.S. Pat. No. 5,589,555, issued Dec. 31, 1996 to DuPont Canada Inc.).

The residence time in each reactor will depend on the design and the capacity of the reactor. Generally the reactors should be operated under conditions to achieve a thorough mixing of the reactants. In addition, it is preferred (for dual reactor operations) that from 20 to 60 weight % of the final polymer is polymerized in the first reactor, with the balance being polymerized in the second reactor. As previously noted, the polymerization reactors are preferably arranged in series (i.e. with the solution from the first reactor being transferred to the second reactor). In a highly preferred embodiment, the first polymerization reactor has a smaller volume than the second polymerization reactor. On leaving the reactor system the solvent is removed and the resulting polymer is finished in a conventional manner.

Further details of the invention are illustrated in the following, non-limiting, examples. The examples are divided into three parts.

The first part illustrates the copolymerization of ethylene and octene-1 in a dual polymerization reactor system using a Ziegler Natta catalyst.

The second part illustrates the preparation of the inventive films in a double bubble film extrusion process.

The third part illustrates the actual use of the inventive films in a shrink packaging operation.

Test Procedures Used in the Examples are Briefly Described Below

1. Melt Index: "$I_2$", "$I_6$", "$I_{21}$" and Melt Flow Ratio (which is calculated by dividing $I_{21}$ by $I_2$) were determined according to ASTM D1238. [Note: $I_2$ measurements are made with a 2.16 kg weight and $I_{21}$ measurements are made with a 21.6 kg weight at 190° C.] Test results are reported in units of grams/10 minutes (though these units are often omitted by convention).

2. Stress Exponent ("$S.E_x$") is calculated by $$\frac{\log(I_6/I_2)}{\log(3)}.$$

[Note: Stress Exponent may be regarded as a proxy for molecular weight distribution (i.e. an increase in Stress Exponent value suggests a broadening of molecular weight distribution).]

3. Number average molecular weight (Mn), weight average molecular weight (Mw) and polydispersity (calculated by Mw/Mn) were determined by high temperature Gel Permeation Chromatography "GPC" with differential refractive index "DRI" detection using universal calibration.

4. 1% Secant Modulus (MD/TD) was determined according to ASTM D882.

5. Elongation and Yield measurements were determined according to ASTM D882.

6. Melt strength is determined using the same "melt indexer" apparatus used in the aforementioned ASTM D1238 test method. The apparatus is loaded with resin and preheated for 6 minutes to 190°±0.20° C. as per ASTM D1238. The total piston load used is 18,400 g (consisting of the piston weight of 100 g and a 18,300 g weight). After heating, the polymer is allowed to extrude from the melt indexer die until the piston travels to a predetermined starting point and the strand is removed by cutting. The piston continues to its end point and stops moving. A timing device (e.g. a stopwatch) is activated. The timer is stopped at the instant the extrudate thread falls off the die orifice. The amount of extrudate is then weighed. This procedure is repeated 3 to 5 times yielding different extrudate weights and corresponding times. The results are then plotted on a log-log scale (weight of extrudate in grams versus time in minutes). "Melt strength" is reported as the value (in grams) at the three minute time as is expressed, for example as 0.15 g/3 min.

7. Tensile measurements were made according to ASTM D882.

8. Tear measurements were made according to ASTM D1922.

9. Density was determined using the displacement method according to ASTM D792.

10. Copolymer/homopolymer ("COHO") determinations were made using the Temperature Rising Elution Fractionation (or "TREF") technique which is well known to those skilled in the art and widely described in the literature. As will be understood by those skilled in the art, the "copolymer" and "homopolymer" fractions of the resin have substantially different branching contents and therefore the corresponding crystallization and dissolution temperatures. The results from this analysis are conventionally expressed as a copolymer/homopolymer (or "COHO") ratio. A COHO ratio of 4 indicates that the resin has four parts by weight of copolymer per part by weight homopolymer (or 80% copolymer). Likewise, a COHO ratio of 19 corresponds to 95% copolymer.

11. Shrink force and shrink tension were determined by ASTM D-2838 using an instrumented shrink tension tester made by Dek-Tron Scientific Instruments of Plainfield, N.J.

12. Free shrink (expressed as % shrinkage of total initial area) was determined on specimens having dimensions of 4.0 inch by 4.0 inch (about 10 cm by 10 cm) according to ASTM D-1204 for a 10 minute duration at 110° C.

13. Branch content distribution was determined by TREF-GPC (Temperature Rising Elution Fractionation—Gel Permeation Chromatography). TREF-GPC combines two techniques well known to those skilled in the art of polyethylene characterization and the procedure is briefly described here. The polymer sample is dissolved in solution and crystallized under dilute condition. Polymer was then separated and collected into different fractions according to solubility which is dependent on comonomer content. The comonomer content (as determined by FTIR), the molecular weight distribution (as determined by GPC) and the amount of polymer in each fraction were then determined. Mathematical summation of the fractions provides a distribution of molecular weight and comonomer content for the entire sample.

14. Puncture strength measurement was determined as follows. An instrumented physical properties testing machine (Instron 4204 Universal Testing Machine) equipped with 1 kilo Newton load cell and a 1½" (38.1 mm) tapered probe head coated with poly (tetrafluoroethylene) (sold under the trademark TEFLON®) are used. A film sample is clamped beneath the probe head with the probe head and the film liberally coated with a water soluble lubricant. The probe head is then pushed through the sample at a speed of 20"/min (500 mm/min) to the rupture point. The final result is calculated based on the energy at failure normalized to 1 mm film thickness for a minimum of five replicate analyses. The test results are shown in Tables 3 and 4 in the row entitled "Slow Puncture with Teflon" and are expressed in Joules per millimeter.

EXAMPLES

Part 1

This example illustrates the continuous flow, solution copolymerization of ethylene at a medium pressure using a pilot scale, dual reactor system and a Ziegler Natta catalyst. Both reactors were continuously stirred tank reactors ("CSTRs") and referred to hereinafter as Reactor 1 (or Rx1) and Reactor 2 (or Rx2). The first reactor operated at a relatively low temperature. The contents from the first reactor flow into the second reactor. The first reactor had a volume of 12 liters. Monomers, solvent and catalyst were fed into the reactor as indicated in Table 1. The solvent used in these experiments was methyl pentane. The contents of the first reactor were discharged through an exit port into a second reactor having a volume of 24 liters. A Ziegler Natta catalyst was used in all experiment catalyst components consisting of titanium tetrachloride (TiCl$_4$), butyl ethyl magnesium (BEM) and tertiary butyl chloride (TBC), with an aluminum activator consisting of triethyl aluminum (TEAL) and diethyl aluminum ethoxide (DEAO). The BEM and TEAL were provided "premixed" (5/1 Mg/Ti mole ratio).

All catalyst components were mixed in the methyl pentane solvent. The mixing order was BEM/TEAL and TBC; followed by TiCl$_4$; followed by DEAO. The catalyst was pumped into the reactor together with the methyl pentane solvent. The catalyst flow rate had an aim point as shown in the table and was adjusted to maintain total ethylene conversions above 80%. Total ethylene conversions observed in the dual reactor system are shown in Table 1 as "$Q_{Total}$". By way of illustration, the total flow of monomer and solvent to Rx1 for Resin 1 (R1) was 432kg/hr (consisting of 37 kg/hr ethylene; 30 kg/hr octene; and by difference 340 kg/hr of solvent). Similarly, the total fresh feed of monomer and solvent to Rx2 for Resin 1 was a total of 390 kg/hr which contained 59 kg/hr of fresh ethylene, 0 kg/hr of fresh octene and 331 kg/hr of fresh solvent. The temperature of this fresh feed to Rx2 was 37° C. The total flow of feeds to Rx2 consisted of the fresh feed combined with the contents from Rx1. Total flow rates are shown as entry "Total TSR" in Table 1 (for example, the TSR value for Resin 1 was 822 kg/hr).

Table 1 also shows hydrogen flow rates (grams per hour, added as a telomerization agent to reduce polymer molecular weight) and catalyst concentrations. By way of illustration, the aim point for titanium concentration in Rx1 for Resin 1 was 3.07 ppm (weight basis); the Mg/Al1 ratio was 1.22 (where Al1 refers to moles Aluminum provided by the TEAL); the TBC/Mg mole ratio was 2.23 and the Al2/Ti ratio was 1.30 (where Al2 refers to moles aluminum provided by the DEAO).

The ΔTR1 and ΔTR2 entries in Table 1 are a measure of the internal temperature gradient within reactors Rx1 and Rx2 respectively. A pair of thermocouples is located in each of the reactors with one thermocouple being located in the top third of the reactor and the other in the bottom third. The temperature difference (or delta, or "Δ") between these thermocouples is shown in Table 1. For example, ΔTR1 (the temperature difference between the two thermocouples in Rx1) was 1° C. for Resin 1 and ΔTR2 was 8° C. for Resin 1. Rx1 was equipped with a dual shear agitator system comprising a conventional (but efficient) agitator plus a helical ribbon (as disclosed in copending U.S. Pat. No. 6,024,483) and Rx2 was equipped with a conventional agitator and a high powered motor to drive the agitator.

TABLE 1

Polymerization Conditions

| Product | Resin 1 (R1) | Resin 2 comparative (R2-c) | Resin 3 (R3) | Resin 4 (R4) | Resin 5 (R5) |
|---|---|---|---|---|---|
| Rx1 | | | | | |
| Total Flow (kg/hr) | 432 | 426 | 189 | 10 | 10 |
| Ethylene (kg/hr) | 37 | 37 | 18 | — | — |
| Octene (kg/hr) | 30 | 13 | 17 | — | — |
| Hydrogen (ppm) | 0.9 | 0.9 | 0 | — | — |
| R1 Inlet (° C.) | 35 | 36 | 33 | 23 | 29 |
| R1 (° C.) | 144.0 | 145.0 | 163 | — | — |
| Δ TR1 | 1 | 1 | 1 | — | — |
| Reactor Pressure (MPa) | 13.85 | 13.96 | 13.46 | 13.34 | 13.06 |
| Rx2 | | | | | |
| Total Flow (kg/hr) | 390 | 394 | 577 | 562 | 666 |
| Ethylene (kg/hr) | 59 | 59 | 61 | 75 | 85 |
| Octene (kg/hr) | 0 | 33 | 50 | 48 | 49 |
| Hydrogen (ppm) | 0.6 | 0.5 | 1 | — | — |
| R2 Inlet (° C.) | 37 | 38 | 33 | 33 | 33 |
| R2 (° C.) | 193 | 193 | 171 | 188 | 184 |
| Δ TR2 | 8 | 8 | 6 | 3 | 9 |
| Reactor Pressure (MPa) | 13.97 | 14.05 | 13.53 | 13.56 | 13.21 |
| $Q_{Total}$ | 95.6 | 95.5 | 91.2 | 92.5 | 94.6 |
| Total TSR (kg/hr) | 822 | 820 | 766 | 562 | 666 |
| Rx1 Catalyst | | | | | |
| Ti (ppm) | 3.07 | 3.12 | — | — | — |
| Mg/Al1 | 1.22 | 1.22 | — | — | — |
| TBC/Mg | 2.23 | 2.24 | — | — | — |
| Al2/Ti | 1.30 | 1.29 | — | — | — |
| Rx2 Catalyst | | | | | |
| Ti (ppm) | 4.10 | 4.14 | — | 4.10 | 3.34 |
| Mg/Al1 | 1.31 | 1.30 | — | 1.29 | 1.52 |
| TBC/Mg | 2.08 | 2.10 | — | 2.11 | 1.89 |
| Al2/Ti | 1.20 | 1.19 | — | 1.19 | 1.18 |
| Density (g/cc) | 0.9195 | 0.9202 | 0.9141 | 0.9210 | 0.9190 |

TABLE 1-continued

Polymerization Conditions

| Product | Resin 1 (R1) | Resin 2 comparative (R2-c) | Resin 3 (R3) | Resin 4 (R4) | Resin 5 (R5) |
|---|---|---|---|---|---|
| $I_2$ | 0.5 | 0.57 | 0.57 | 1.0 | 0.5 |
| S. Ex | 1.37 | 1.35 | 1.40 | 1.34 | 1.29 |
| COHO | 4.4 | 3.7 | 4.7 | 3.7* | 4.4 |

*estimated (initial TREF results indicated a higher COHO ratio)

Resin 1 (R1) is preferred. This resin was prepared by adding all of the octene comonomer to the first reactor. However, only a comparatively small portion of the ethylene was added to the first reactor (37 kg/hr) and a larger portion 59 (kg/hr) to the second reactor. In general, preferred LLDPE resins for shrink films are prepared in a dual reactor process in which A) from 80 to 100 weight % of the total comonomer (octene, in this example) is added to the first reactor and the balance (i.e. from 0 to 20 weight %) of the total comonomer is added to the second reactor and B) from 20 to 50 weight % of the total ethylene is added to the first reactor and the balance (50 to 80 weight %) is added to the second reactor.

The data in Table 2 provides additional information about the distribution of comonomer in resins R1, R2-c, R4 and R5 (from Table 1) and two commercially available resins C1 (sold under the tradename SCLAIR 11G1 by NOVA Chemicals Corporation) and C2 (sold under the tradename Dowlex 2045 by the Dow Chemical Company). All of the resins have a similar density. This is reflected in the column "Total $C_8$ Content (wt %)" which shows that all of the resins contain from 10.0 to 10.4 weight % octene (as determined by nuclear magnetic resonance, or NMR).

Comonomer content distribution, i.e. comonomer content as a function of molecular weight, was analyzed by TREF-GPC. Table 2 summarizes the comonomer contents corresponding to the log molecular weights of 5.0 (i.e. molecular weight, or Mw=100,000), 5.5 (i.e. Mw~315,000), and 5.95 (i.e. Mw~891,000) for each sample in terms of branches per 1000 carbon (C) atoms. All of the resins of Table 2 do have decreasing comonomer content with increasing molecular weight. However, each of the inventive resins has a branch content of greater than 10 at log Mw=5.5. Furthermore, it may be observed that the highly preferred resin R1 (prepared according to the dual reactor polymerization process described above) has a fairly uniform or "flat" branch frequency between log Mw=5.0 and log Mw=5.5 (whereas the comonomer content of the comparative resins C1, C2 and R2-c drops off more sharply with increasing Mw). In general, when preparing the shrink films of this invention, it is preferred to use LLDPE resins having 1) a branch content of greater than or equal to 14.0 branches per 1000 carbon atoms at log molecular weight of 5.0 and 2) a branch content of greater than or equal to 12.0 branches per 1000 carbon atoms at log molecular weight of 5.5.

TABLE 2

Comonomer Content Distribution as a Function of Molecular Weight

| Resin | *Total $C_8$ Content (wt %) | $C_8$ Content 5.0 < Log (Mw) < 5.95 (wt %) | †Comonomer Content at Log (Mw) (Branches/1000 Carbons) | | |
|---|---|---|---|---|---|
| | | | 5.0 | 5.5 | 5.95 |
| R1 | 10.0 | 3.1 | 14.5 | 14.2 | 9.6 |
| R2-c | 10.1 | 2.5 | 14.0 | 10.4 | 7.5 |
| R4 | 10.2 | 2.8 | 14.0 | 12.0 | 5.9 |
| R5 | 10.4 | 2.7 | 15.4 | 13.0 | 5.6 |
| C1 | 10.1 | 2.1 | 12.6 | 8.6 | 5.0 |
| C2 | 10.1 | 2.5 | 13.6 | 11.5 | 7.3 |

*Determined by high temperature NMR
†Determined by TREF-GPC
-c Comparative

Part 2

This illustrates the preparation of plastic films according to this invention.

Shrink films were prepared at the facilities of Soten S.p.A., located in Rho (Milan) Italy. Soten is a company which manufacturers and sells both of 1) polyolefin shrink film and 2) extrusion lines (i.e. the machinery used to prepare shrink films).

The extrusion line used at Soten starts with the preparation of a film tube using techniques and procedures which are well known to those skilled in the art and is briefly described here. Polymer resin is molten in the extruder and extruded through an annular die to form a tube (or the "first bubble"). The film tube is then immediately quenched with cascading chilled water to the solid state. The quenched tube is then collapsed and reheated through an infrared heating oven to soften. The softened tube is then inflated by pressurized air to expand and thus form the second bubble. The second bubble is biaxially (simultaneously in two directions) stretched ("oriented") 500% both in the machine direction (by the stretching nip) and in the transverse direction (by the pressurized internal air). The bubble is subsequently air cooled, flattened and wound onto a jumbo roll which can then be slit into appropriate sizes.

Films were prepared with the polyethylene resins described in Part 1, and the resulting films are named according to the nomenclature used in Part 1 (e.g. film R1 was prepared from resin R1 and film C1 was prepared from resin C1).

Film properties are shown in Table 3. The film made from R2 has a relatively poor balance of properties and is, accordingly, a comparative resin. Whilst not wishing to be bound by theory, it is believed that the poor balance of properties is a result of comparatively poor comonomer distribution (as indicated by the data shown in Table 2).

Table 4 contains data which describe four comparative films. Films C1 and C2 were prepared on the above described Soten film line using commercially available linear low density polyethylene resins. (More specifically C1 was produced from an ethylene octene resin sold under the tradename SCLAIR 11G1 by NOVA Chemicals Corporation and C2 was produced from a similar ethylene octene resin sold under the tradename Dowlex 2045 by the Dow Chemical Company).

Films C3 and C4 are commercially available shrink films which are sold under the tradenames Cryovac® D-955 (a tradename of Sealed Air Corporation of Saddle Brook, N.J.) and Clysar® HP (a tradename of DuPont of Wilmington, Del.), respectively. The commercially available Cryovac® D-955 film is believed to be a multilayer coextruded film with at least one of the layers containing EVA and is irradiated. The commercially available Clysar® HP film is believed to be a monolayer film prepared with a blend of EVA and LLDPE polymers and is also irradiated.

The commercial films have a nominal thickness of 0.6 mil. Similarly, the inventive (and comparative) films which were prepared in the Examples had an "aim point" of 0.6 mil.

A review of the data provided in Tables 3 and 4 highlights the following advantages of the inventive resins.

Firstly, and most importantly, it should be noted that 1) the inventive films are monolayer (as opposed to multilayer); 2) the inventive films are not crosslinked by irradiation; and 3) the inventive films are not blended with ethylene-vinyl-acetate (EVA) resin, which is known to those skilled in the art to improve the efficiency of crosslinking and shrink performance.

In spite of the fact that the inventive films are not multilayer structures, do not contain EVA and are not irradiated, the following advantages may be observed.

1. The inventive resins have excellent physical properties, particularly the dart impact strength.
2. The inventive films have excellent tensile strength.
3. The inventive films have comparable "free shrink" (expressed as % shrinkage of the initial area) to the commercial shrink film products. This is described in further detail in Part 3 of the Examples.
4. The inventive films have very good shrink tension (in both the transverse direction, TD and machine direction, MD).
5. In addition, the most highly preferred film (made from Resin 1) also exhibits excellent optical properties (i.e. gloss and haze).

Part 3 Shrink Wrapping

This example describes the use of a shrink film machine (made by Elantech Incorporated of Saint-Laurent, Quebec, Canada) which consists of an L-bar impulse wire sealer and a shrink packaging tunnel to prepare shrink wrapped booklets.

The shrink packaging tunnel consists of a controlled forced-convection oven with a conveyor which runs through the tunnel. The conveyor belt may be operated at speeds of between 2 feet (about 61 centimeters or cm) per minute and 42 feet (or about 1280 cm) per minute. The tunnel temperature may be controlled over a temperature range between room temperature and 300° C., with temperatures between 125° C. and 200° C. being typical. The rectangular tunnel has a length of 18" (about 46 cm) and two openings, both measuring 13" (about 33 cm) in width and 8.5" (about 22 cm) in height.

The booklets which were "shrink wrapped" by the machine had dimensions of 8.5" (about 22 cm) width×11" (about 28 cm) length and approximately 0.2" (about 0.5 cm) thickness. To start with, each of the booklets was pre-wrapped with a loose fitting (but standard sized) package made from the films described in the previous examples. This was done by sealing the films using the "L-shaped" impulse heat sealer to form a sealed package around the booklets. The seals were made so as to allow a loose fitting package with about ¾" (about 2 cm) of extra film material being provided beyond the edges of the booklets.

These loosely packaged booklets were then run through the above described shrink tunnel under the conditions which were shown Tables 5.1 to 5.4.

In general, the oven temperature was controlled at temperatures of 125° C. (Table 5.1); 150° C. (Table 5.2); 175° C. (Table 5.3); and 200° C. (Table 5.4) and the operation of the conveyor belt was adjusted over a range of belt speeds. In this manner, the films were exposed to a variety of heating (shrinking) conditions. Films which were exposed to too much heat (i.e. high oven temperature and/or slow conveyor belt speeds) failed because of "burn through"—i.e. holes created by localized melting of exposed film surface. Conversely, films which were not exposed to sufficient heat did not provide acceptable packages with defects such as "crow's feet" (wrinkles) and "dog's ears" (improperly shrink package corners) being observed. Persons skilled in the art desire a broad "processing window"—i.e. they desire films which produce acceptable packages over a wide combination of oven temperatures and conveyor belt speeds.

The data in Tables 5.1 to 5.4 describe the minimum and maximum conveyor belt speed (expressed in feet per minute) which were observed to produce "perfect" shrink wrapped packages (i.e. packages with no visually discernable defects such as wrinkles, slacks, burned holes, etc.).

As shown in the accompanying Tables, the films of the present invention do provide a very broad processing window for the preparation of acceptable shrink wrapped packages.

TABLE 3

Film Properties

| Properties | Units | Resin 1 (R1) | Resin 2 Comparative (R2-c) | Resin 3 (R3) | Resin 4 (R4) | Resin 5 (R5) |
|---|---|---|---|---|---|---|
| Orientation Temperature | ° C. | 101 | 101 | 99.5 | 100.5 | 99.5 |
| Density | g/cm³ | 0.9195 | 0.9202 | 0.9141 | 0.9210 | 0.9190 |
| Melt Index | g/10 min | 0.5 | 0.57 | 0.57 | 1.0 | 0.5 |
| Melt Strength | g/3 min | 0.594 | 0.525 | 0.349 | 0.19 | 0.388 |
| Film Properties | | | | | | |
| Thickness | mil | 0.6 | 0.5 | 0.6 | 0.59 | 0.6 |
| Dart Impact | g/mil | 604 | 355 | 480 | 484 | 536 |
| Slow Puncture with TEFLON ® | J/mm | 46 | 34 | 42 | 41 | 51 |
| Tear Strength - MD | g/mil | 27 | 27.2 | 31.2 | 44 | 23 |
| Tear Strength - TD | g/mil | 36 | 16 | 25.7 | 37 | 42 |
| Tensile Strength - MD | MPa | 178 | 152 | 136 | 169 | 168 |
| Tensile Strength - TD | MPa | 130.7 | 153 | 134 | 139 | 126 |
| Tensile Elongation - MD | % | 113 | 119 | 122 | 121 | 106 |
| Tensile Elongation - TD | % | 126 | 90 | 138 | 150 | 160 |

TABLE 3-continued

Film Properties

| Properties | Units | Resin 1 (R1) | Resin 2 Comparative (R2-c) | Resin 3 (R3) | Resin 4 (R4) | Resin 5 (R5) |
|---|---|---|---|---|---|---|
| 1% Secant Modulus - MD | MPa | 339 | 335 | 232 | 340 | 328 |
| 1% Secant Modulus - TD | MPa | 326 | 414 | 291 | 375 | 346 |
| Haze | % | 2.83 | 2.86 | 3.56 | 3.03 | 3.04 |
| Gloss @ 45° | | 86.7 | 87.6 | 85.7 | 86.9 | 87.0 |
| Shrink Tension - MD | psi | 532 | 540 | 439 | 430 | 419 |
| Shrink Tension - TD | psi | 517 | 338 | 371 | 430 | 501 |
| Free Shrink @ 110° C. | % Area | 69.5 | 66.8 | 77.5 | 74.0 | 72.1 |

TABLE 4

Comparative Films

| Properties | Units | Comparative Film 1 | Comparative Film 2 | Comparative Film 3 | Comparative Film 4 |
|---|---|---|---|---|---|
| Orientation Temperature | ° C. | 104 | 104 | N/A | N/A |
| Density | g/cm$^3$ | 0.9207 | 0.9208 | 0.9227* | 0.9225* |
| Melt Index | g/10 min | 0.72 | 0.97 | N/A | N/A |
| Melt Strength | g/3 min | 0.242 | 0.6 | N/A | N/A |
| Film Properties | | | | | |
| Thickness | mil | 0.78 | 0.51 | 0.7 | 0.62 |
| Dart Impact | g/mil | 446 | 454 | 437 | 506 |
| Slow Puncture with TEFLON ® | J/mm | 41 | 36 | 32 | 26 |
| Tear Strength - MD | g/mil | 23 | 25 | 31.5 | 40.8 |
| Tear Strength - TD | g/mil | 22 | 26 | 22 | 24 |
| Tensile Strength - MD | MPa | 166 | 147 | 126 | 94.7 |
| Tensile Strength - TD | MPa | 170 | 144 | 110 | 118 |
| Tensile Elongation - MD | % | 123 | 134 | 76 | 130 |
| Tensile Elongation - TD | % | 127 | 129 | 88 | 146 |
| 1% Secant Modulus - MD | MPa | 344 | 299 | 397 | 323 |
| 1% Secant Modulus - TD | MPa | 369 | 344 | 404 | 320 |
| Haze | % | 3.77 | 3.22 | 3.86 | 3.05 |
| Gloss @ 45° | | 79.5 | 80.6 | 85.9 | 87 |
| Shrink Tension - MD | psi | 323 | 334 | 481 | 284 |
| Shrink Tension - TD | psi | 283 | 293 | 440 | 434 |
| Free Shrink @ 110° C. | % Area | 56.6 | 61.9 | 74.7 | 70.8 |

N/A not available
*contains antiblocking agents; resin density estimated to be 0.920 g/cm$^3$

TABLE 5.1

Shrink Tunnel Operation at 125° C.

| Film | Minimum Belt Speed (feet/minute) | Maximum Belt Speed (feet/minute) |
|---|---|---|
| R1 | 2 | 4 |
| R5 | 2 | 4 |
| C3 | 2 | 4 |
| C4 | 2 | 4 |
| R2 | 2 | 4 |
| R3 | 2 | 4 |
| R4 | 2 | 4 |
| C1 | 2 | 4 |
| C2 | 2 | 4 |

TABLE 5.2

Shrink Tunnel Operation at 150° C.

| Film | Minimum Belt Speed (feet/minute) | Maximum Belt Speed (feet/minute) |
|---|---|---|
| R1 | 4 | 20 |
| R5 | 4 | 20 |
| C3 | 8 | 25 |
| C4 | 2 | 20 |
| R2 | 12 | 18 |
| R3 | 4 | 18 |
| R4 | 2 | 4 |
| C1 | 4 | 8 |
| C2 | 4 | 12 |

TABLE 5.3

Shrink Tunnel Operation at 175° C.

| Film | Minimum Belt Speed (feet/minute) | Maximum Belt Speed (feet/minute) |
|---|---|---|
| R1 | 18 | 42 |
| R5 | 8 | 42 |
| C3 | 12 | 35 |
| C4 | 12 | 20 |
| R2 | 18 | 42 |
| R3 | 18 | 42 |
| R4 | 18 | 20 |
| C1 | 18 | 20 |
| C2 | 18 | 20 |

TABLE 5.4

Shrink Tunnel Operation at 200° C.

| Film | Minimum Belt Speed (feet/minute) | Maximum Belt Speed (feet/minute) |
|---|---|---|
| R1 | 20 | 42 |
| R5 | 20 | 42 |
| C3 | 35 | 42 |
| C4 | 35 | 42 |
| R2 | 40 | 42 |
| R3 | 18 | 42 |
| R4 | 35 | 42 |
| C1 | 40 | 42 |
| C2 | 35 | 40 |

What is claimed is:

1. A monolayer shrink film having, in non-crosslinked form, 1) a dart impact strength as determined by ASTM D1709 of greater than 450 grams per mil; 2) a tear strength as determined by ASTM D1922 of greater than 25 grams per mil in the transverse direction; and 3) a shrink tension of greater than 400 pounds per square inch (psi) in the machine direction; wherein said shrink film is prepared from a pseudohomogeneous linear low density polyethylene having a COHO ratio of from 3.5/1 to 19/1.

2. A multilayer shrink film which incorporates at least one monolayer as defined in claim 1.

3. The multilayer shrink film of claim 2 wherein said multilayer shrink film is prepared by coextrusion.

4. The shrink film of claim 1 wherein said linear low density polyethylene is an ethylene-octene copolymer.

5. The shrink film of claim 4 wherein said ethylene-octene copolymer is further characterized by being prepared in a solution polymerization process using a Ziegler Natta polymerization catalyst system which is characterized by containing a titanium halide, a magnesium alkyl compound, a chlorinating agent and an aluminum alkoxide cocatalyst.

6. The shrink film of claim 5 wherein said solution polymerization process is a dual reactor process and wherein said ethylene-octene copolymer is further characterized by having a stress exponent of greater than 1.28.

7. The shrink film of claim 1 which is crosslinked by irradiation.

8. The shrink film of claim 2 which is crosslinked by irradiation.

9. The film of claim 1 which is further characterized by having a puncture strength of greater than 40 J/mm.

10. The monolayer shrink film of claim 1 wherein said linear low density polyethylene is prepared in a dual reactor solution polymerization process.

11. The monolayer shrink film of claim 10 wherein said linear low density polyethylene is an ethylene-octene copolymer and wherein the flows of ethylene monomer and octene monomer to the first polymerization reactor and the second polymerization reactor of said dual reactor solution polymerization process satisfy the following conditions:

1) from 20 to 50 weight % of the total weight of said ethylene monomer and from 80 to 100 weight % of the total weight of said octene monomer is directed to said first polymerization reactor; and 2) from 50 to 80 weight % of the total weight of said ethylene monomer and from 0 to 20 weight % of the total weight of said octene monomer is directed to said second polymerization reactor.

* * * * *